United States Patent
Pursifull (10) Patent No.: US 8,360,015 B2
(45) Date of Patent: *Jan. 29, 2013

(54) ENGINE FUEL REFORMER MONITORING

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/231,207

(22) Filed: Sep. 13, 2011

(65) Prior Publication Data

US 2012/0055423 A1 Mar. 8, 2012

Related U.S. Application Data

(63) Continuation of application No. 12/756,845, filed on Apr. 8, 2010, now Pat. No. 8,015,952.

(51) Int. Cl.
*F02M 27/02* (2006.01)
*G01N 33/497* (2006.01)

(52) U.S. Cl. ................... 123/3; 123/2; 73/23.31

(58) Field of Classification Search .............. 123/2, 3, 123/1 A; 73/23.31
See application file for complete search history.

(56) References Cited

U.S. PATENT DOCUMENTS

| | | |
|---|---|---|
| 5,176,122 A | 1/1993 | Ito |
| 5,224,452 A | 7/1993 | Tomizawa |
| 5,372,411 A | 12/1994 | Gerstenmaier et al. |
| 5,445,019 A | 8/1995 | Glidewell et al. |
| 5,526,797 A | 6/1996 | Stokes |
| 5,542,394 A | 8/1996 | Tomisawa |
| 5,633,458 A | 5/1997 | Pauli et al. |
| 5,682,864 A | 11/1997 | Shirakawa |
| 5,740,667 A | 4/1998 | Bhattacharyya et al. |
| 5,762,366 A | 6/1998 | Faye |
| 5,857,445 A | 1/1999 | Shimada et al. |
| 6,024,069 A | 2/2000 | Yoshino |
| 6,058,906 A | 5/2000 | Yoshino |
| 6,088,647 A | 7/2000 | Hemberger et al. |
| 6,176,215 B1 | 1/2001 | Baur et al. |
| 6,213,104 B1 | 4/2001 | Ishikirlyama et al. |
| 6,247,449 B1 | 6/2001 | Persson |
| 6,318,306 B1 | 11/2001 | Komatsu |
| 6,334,424 B1 | 1/2002 | Ito |
| 6,349,702 B1 | 2/2002 | Nishiyama |
| 6,390,030 B1 | 5/2002 | Isogawa et al. |
| 6,591,817 B2 | 7/2003 | Deutsch |
| 6,705,295 B1 | 3/2004 | Tarroux et al. |
| 6,711,893 B2 | 3/2004 | Ueda et al. |
| 6,715,452 B1 | 4/2004 | Taylor, III et al. |

(Continued)

FOREIGN PATENT DOCUMENTS

EP 2 048 339 A1 4/2009

OTHER PUBLICATIONS

Kamio, Junichi, et al., "Study on HCCI-SI Combustion Using Fuels Containing Ethanol", SAE Technical Paper Series No. 2007-01-4051, Powertrain & Fluid Systems, Conference & Exhibition, Rosemont, IL, Oct. 29-Nov. 1, 2007, 12 pages.

(Continued)

*Primary Examiner* — Noah Kamen
(74) *Attorney, Agent, or Firm* — Julia Voutyras; Alleman Hall McCoy Russell & Tuttle LLP (57) ABSTRACT

Systems and methods for monitoring a fuel reformer which reforms ethanol into a reformate gas comprising $H_2$, CO, and $CH_4$ for fueling an engine are provided. Degradation of the fuel reformer may be indicated based on an amount of ethanol injected into the fuel reformer and an amount of at least one of $H_2$, CO, and $CH_4$ produced by the fuel reformer.

21 Claims, 5 Drawing Sheets

U.S. PATENT DOCUMENTS

| | | | |
|---|---|---|---|
| 6,729,301 | B2 | 5/2004 | Nakamori et al. |
| 6,751,543 | B2 | 6/2004 | Gras et al. |
| 6,851,398 | B2 | 2/2005 | Taylor, III et al. |
| 6,964,261 | B2 | 11/2005 | Warne et al. |
| 6,988,481 | B2 | 1/2006 | Sen et al. |
| 6,990,956 | B2 | 1/2006 | Niimi |
| 6,997,142 | B2 | 2/2006 | Wakao et al. |
| 7,047,940 | B2 | 5/2006 | Niimi |
| 7,089,888 | B2 | 8/2006 | Mirji |
| 7,104,244 | B2 | 9/2006 | Nishi et al. |
| 7,159,541 | B2 | 1/2007 | Wakao et al. |
| 7,203,579 | B2 | 4/2007 | Yokota et al. |
| 7,228,841 | B2 | 6/2007 | Takemoto et al. |
| 7,261,065 | B2 | 8/2007 | Aimoto et al. |
| 7,370,609 | B2 | 5/2008 | Kamio |
| 7,454,898 | B2 | 11/2008 | Allgeier et al. |
| 7,523,744 | B2 | 4/2009 | Ayame |
| 7,530,335 | B2 | 5/2009 | Sakurai et al. |
| 8,001,934 | B2 | 8/2011 | Leone et al. |
| 8,037,850 | B2 | 10/2011 | Pursifull |
| 8,041,500 | B2 | 10/2011 | Leone |
| 2001/0003977 | A1 | 6/2001 | Hayashi et al. |
| 2002/0056229 | A1 | 5/2002 | Doling et al. |
| 2004/0139944 | A1 | 7/2004 | Nakano et al. |
| 2004/0205998 | A1 | 10/2004 | Wakao et al. |
| 2005/0086865 | A1 | 4/2005 | Crane, Jr. et al. |
| 2008/0010993 | A1 | 1/2008 | Morgenstern |
| 2008/0098985 | A1 | 5/2008 | Kamio |
| 2008/0141984 | A1 | 6/2008 | Haga |
| 2008/0221778 | A1 | 9/2008 | Kakuho et al. |
| 2008/0228375 | A1 | 9/2008 | Ashida et al. |
| 2008/0282998 | A1 | 11/2008 | Kuzuoka et al. |
| 2009/0017987 | A1 | 1/2009 | Saton et al. |
| 2009/0030588 | A1 | 1/2009 | Yamashita |
| 2009/0043479 | A1 | 2/2009 | Noda et al. |
| 2009/0065409 | A1 | 3/2009 | Kamio et al. |
| 2009/0071453 | A1 | 3/2009 | Stockhausen et al. |
| 2011/0132283 | A1 | 6/2011 | Czekala et al. |
| 2011/0132284 | A1 | 6/2011 | Leone et al. |
| 2011/0132286 | A1 | 6/2011 | Leone et al. |
| 2011/0132289 | A1 | 6/2011 | Pursifull et al. |
| 2011/0132290 | A1 | 6/2011 | Leone et al. |
| 2011/0132306 | A1 | 6/2011 | Kerns et al. |
| 2011/0132321 | A1 | 6/2011 | Pursifull |
| 2011/0132323 | A1 | 6/2011 | Surnilla et al. |
| 2011/0137537 | A1 | 6/2011 | Leone |

OTHER PUBLICATIONS

Hoffmann, Walter, et al., "A New Approach to Ethanol Utilization: High Efficiency and Low Nox in an Engine Operating on Simulated Reformed Ethanol", SAE Technical Paper Series No. 2008-01-2415, Powertrain, Fuels, & Lubricants Meeting, Rosemont, IL, Oct. 6-9, 2008, 11 pages.

Morgenstern, David A., et al., "Low Temperature Reforming of Ethanol over Copper-Plated Randy Nickel: A New Route to Sustainable Hydrogen for Transportation," Revised manuscript received May 4, 2005, 9 pages.

Green Car Congress, "Honda Making Significant Progress on HCCI Engine for Hybrid Application," <http://www.greencarcongress.com/2005/10/honda_making_si.html>, Oct. 28, 2009, 8 pages.

ISA Korean Intellectual Property Office, International Search Report of PCT/US2011/031096, Nov. 15, 2011, WIPO, 11 pages.

ENGINE FUEL REFORMER MONITORING

CROSS-REFERENCE TO RELATED APPLICATIONS

The present application is a continuation of U.S. patent application Ser. No. 12/756,845 filed Apr. 8, 2010 now U.S. Pat. No. 8,015,952, the entire contents of which are incorporated herein by reference for all purposes.

FIELD

The present description relates to a method for operating an engine with a fuel reformer.

BACKGROUND AND SUMMARY

Fuel reformers can be used to convert alcohol fuels into gaseous fuels (reformates) to fuel an engine. For example, an ethanol reformer can reform ethanol into a reformate gas comprising hydrogen ($H_2$), carbon monoxide (CO), and methane ($CH_4$) for combustion in an engine.

The inventors herein have recognized that the amount of reformate gas injected into an engine may be based on an assumption that the fuel reformer is operating efficiently, e.g., that the reformer reforms a substantial fraction of the fuel into reformate. If the reformer is not operating efficiently, a significant amount of non-reformed fuel may be output by the reformer. Gaseous fuel reformate may be injected volumetrically into the engine, thus fuel metering errors may result when the reformer is not operating efficiently. Additionally, if the fuel reformer outputs a significant amount of non-reformed fuel, one or more components of the reformer may be degraded and/or unexpected engine knock may occur.

In one example approach, in order to at least partially address the above issues, a method for monitoring a fuel reformer which reforms ethanol into a reformate gas comprising $H_2$, CO, and $CH_4$ for fueling an engine, is provided. The method comprises: injecting an amount of fuel including an amount of ethanol to be reformed into the fuel reformer; and indicating degradation of the fuel reformer based on the amount of ethanol injected into the fuel reformer and an amount of at least one of $H_2$, CO, and $CH_4$ produced by the fuel reformer. In some examples, mitigating actions may be performed if degradation of the fuel reformer is indicated or unexpected engine knock occurs.

In this way, errors in metering of reformate delivery may be reduced and degradation of various reformer system components may be diagnosed and mitigated. Additionally, engine knock may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
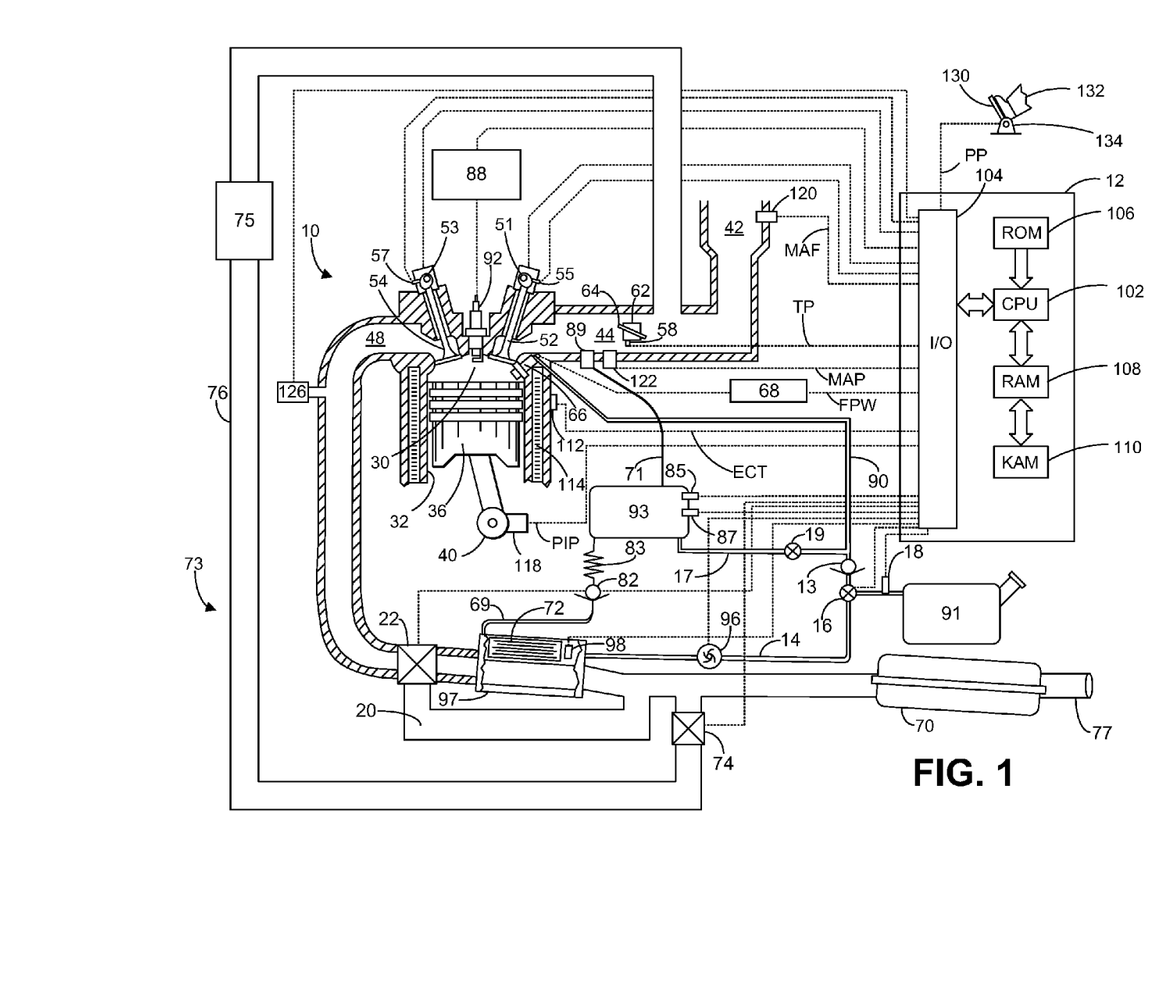
FIG. 1 shows a schematic diagram of an engine with a fuel reformer.

The following description relates to systems and methods for operating an engine with a fuel reformer, a schematic example of which is shown in FIG. 1. Fuel reformers can be used to convert alcohol fuels into gaseous fuels (reformates) to fuel an engine. For example, an ethanol reformer can reform ethanol into a reformate gas comprising hydrogen ($H_2$), carbon monoxide (CO), and methane ($CH_4$) for combustion in an engine.

Use of gaseous reformate in an engine may assist in engine cold starts and engine knock reduction, e.g., during high load engine operating conditions.

When employed as fuel in an engine, delivery of reformate gas to the engine may be metered and injected volumetrically in gaseous form. The amount of reformate gas injected in the engine may depend on a variety of conditions, including an amount of available reformate, e.g., an amount of reformate being produced by the fuel reformer, and/or an amount of reformate stored, e.g., in a reformate storage tank.

Under some conditions, a fuel reformer may not operate efficiently and at least a portion of the fuel fed to the reformer may not be reformed. Thus, the reformer output may include a portion of reformed fuel and a portion of non-reformed fuel. Additionally, under some conditions, condensate may form in the output of the reformer. Condensate in reformer output may be indicative of the presence of non-reformed fuel in the reformer output and/or insufficient heating of the reformer system.

An amount of reformate gas injected into the engine may be based on an assumption that the fuel reformer is operating efficiently, e.g., that the reformer reforms a substantial fraction of the fuel into reformate. However, when one or more components of the reformer are degraded, a significant amount of non-reformed fuel may be output by the reformer. Since gaseous fuel reformate may be injected volumetrically into the engine, fuel metering errors may result when one or more components of the reformer are degraded. Additionally, unexpected engine knock may occur when a significant amount of non-reformed fuel is output by the reformer and delivered to the engine.

A fuel reformer outputting a significant amount of non-reformed fuel and/or condensate may indicate that one or more components of the reformer system are malfunctioning or degraded. For example, the fuel reformer catalyst may be degraded.

Figure 2:
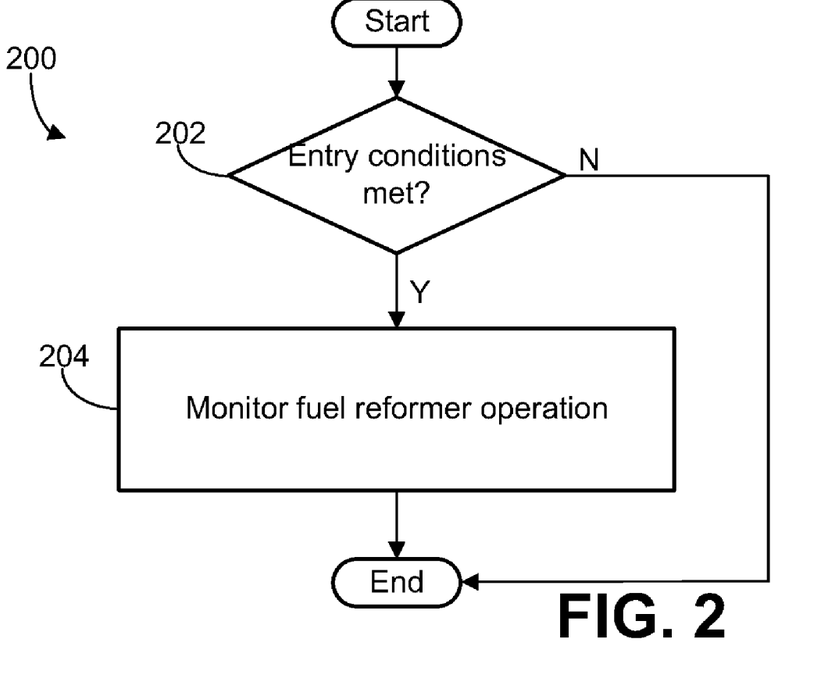
FIG. 2 shows an example method for monitoring reformer operation based on entry conditions.
Figure 3:
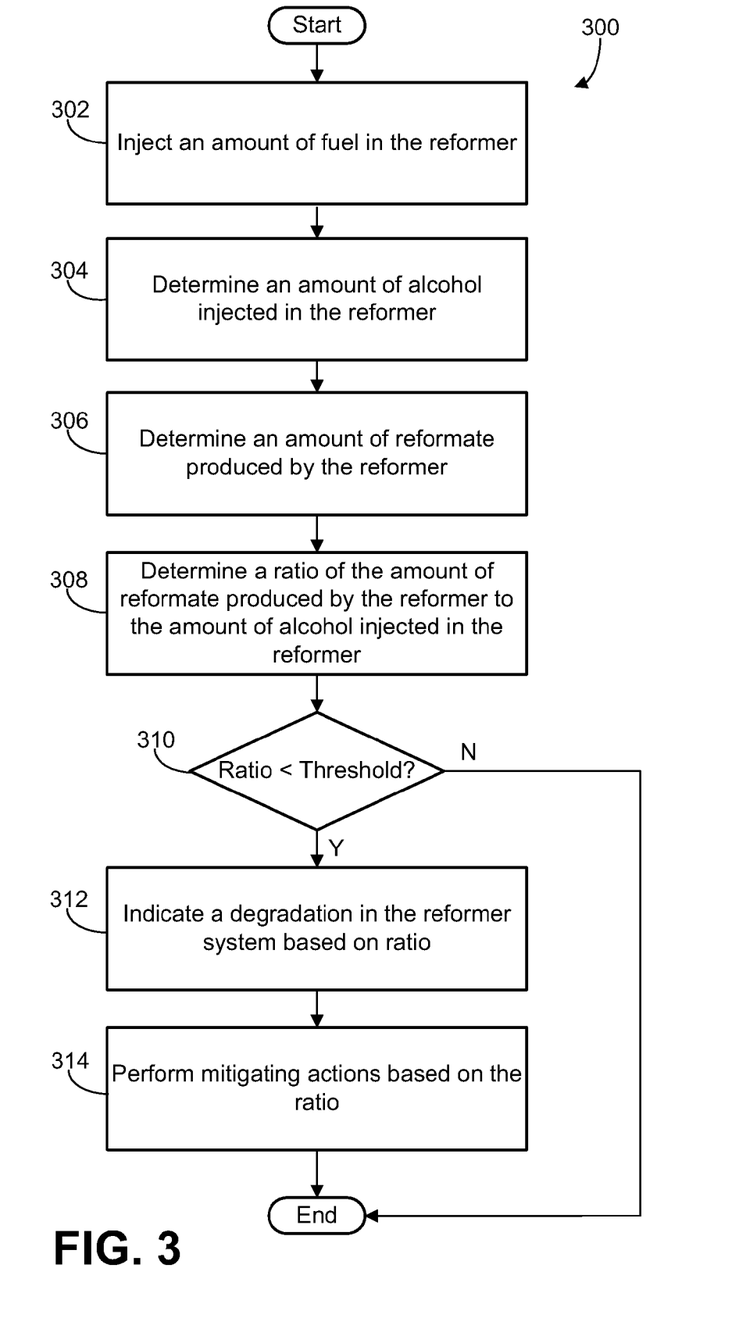
FIG. 3 shows an example method for monitoring reformer operation.
Figure 4:
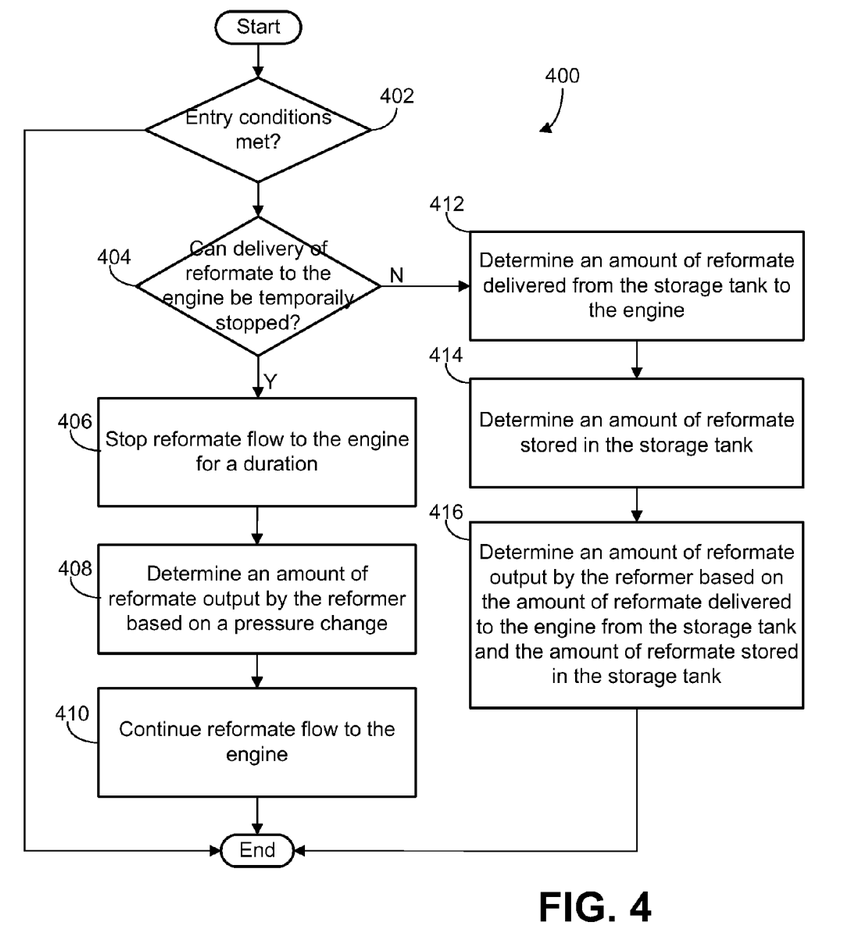
FIG. 4 shows an example method for determining an amount of reformate produced by a reformer.
Figure 5:
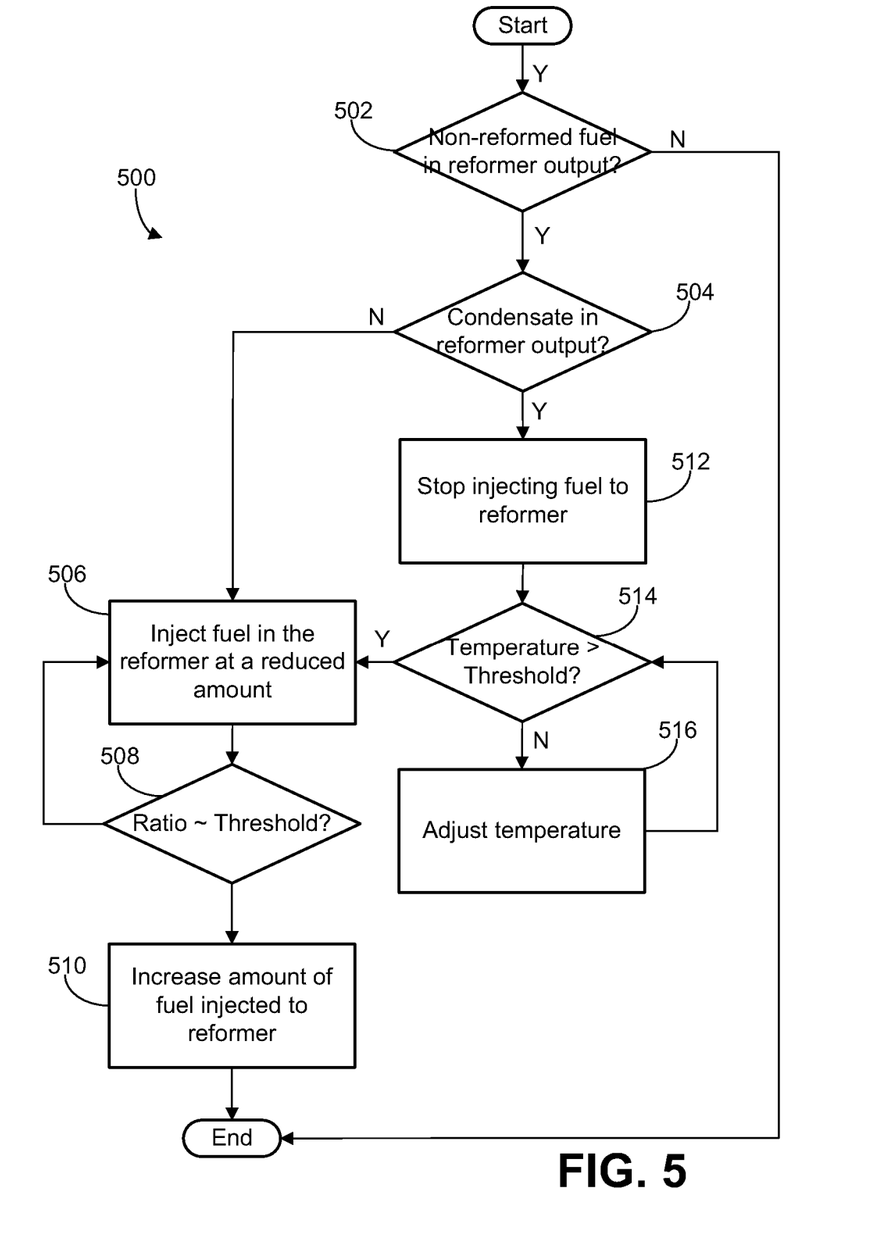
FIG. 5 shows an example method for performing mitigation actions if a degradation in a reformer system is indicated.

Various operating conditions of the reformer may be monitored in order to identify, indicate, diagnose, and/or mitigate problems with reformer operation. Various example methods for monitoring reformer operation are shown in FIGS. 2-4. If a degradation is identified in a reformer system, various mitigating actions may be performed. FIG. 5 shows an example method for performing mitigation actions if a degradation in a reformer system is indicated.

Turning now to FIG. 1, a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some examples, combustion chamber 30 may include two or more intake valves and/or two or more exhaust valves. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP from a throttle position sensor 58. Intake passage 42 may include a mass air flow sensor 120 and a manifold air pressure sensor 122 for providing respective signals MAF and MAP to controller 12.

A fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. In some embodiments, combustion chamber 30 may alternatively or additionally include a fuel injector arranged in intake passage 44 in a configuration that provides what is known as port injection of fuel into the intake port upstream of combustion chamber 30. Fuel may be delivered to fuel injector 66 by a fuel system including a fuel tank 91, a fuel pump within fuel tank 91 (not shown), a fuel line 90, and a fuel rail (not shown).

In some examples, a plurality of fuel tanks may be employed. For example, the plurality of fuel tanks may include an ethanol fuel tank and a gasoline fuel tank. Each of the plurality of fuel tanks may include a fuel pump and various other components used to assist in delivery of fuel to the engine.

A fuel reformer 97 is shown coupled to exhaust passage 48. Fuel reformer 97 is configured to reform fuel supplied by fuel tank 91 via fuel line 14 into a gaseous fuel reformate. For example, when a fuel in fuel tank 91 includes ethanol, fuel reformer 97 may be configured to reform the fuel into a gaseous fuel reformate comprising $H_2$, CO, and $CH_4$.

A valve 16 may be positioned in fuel line 14 to divert fuel delivery either to the reformer or to the engine. Additionally a fuel sensor 18 may be disposed in the fuel line to determine the type of fuel used, e.g. following a refueling event. In some examples, a fuel evaporator may be employed to vaporize the fuel supplied to the fuel reformer. Thus, for example, a fuel evaporator of vaporizer chamber may be disposed in fuel line 14 or within the same unit as the fuel reformer. Fuel may be injected to the reformer by way of a pump 96 disposed in fuel line 14. In some examples, high pressures may be generated in the gases passing through the reformer. Thus in some examples, pump 96 may include a hydraulic pressure multiplier to assist in delivery of fuel to the reformer at high pressures. As another example, fuel may be injected into the reformer during low pressure conditions. For example, fuel may be injected into the reformer when the amount of gaseous fuel output by the reformer is below a threshold value.

Fuel reformer 97 includes a catalyst 72. In some examples, catalyst 72 may include copper at a surface of a thermally conductive metal supporting structure, e.g., copper-plated Raney nickel. For example, a catalyst may be prepared by depositing copper onto a nickel sponge supporting structure with high surface area.

Reformer 97 may use exhaust heat to drive an endothermic dehydrogenation of ethanol as it passes through the catalyst to promote reformation of ethanol into a gaseous reformate fuel comprising $H_2$, CO, and $CH_4$. For example, vaporized ethanol may pass over the catalyst surface while at an elevated temperature. Thus reformer 97 may be thermally coupled to exhaust passage 48. For example, catalyst 72 of reformer 97 may be thermally coupled to a portion of exhaust conduit 48. For example, gaseous reformate from ethanol may increase a fuel value of ethanol when driven by a free source of heat, e.g., exhaust heat. Additionally, gaseous fuels may displace air in the intake manifold and thus lower pumping work.

In some examples, fuel reformer 97 may include an electrical heater 98 for additional temperature control of the fuel reformer. Also, in some examples, a reformer bypass conduit 20 may be disposed in the exhaust conduit in order to direct exhaust gas away from the reformer, e.g., to control the temperature of the fuel reformer. Reformer bypass conduit 20 may include a bypass valve 22 upstream of reformer 97 to control the amount of exhaust gas in thermal contact with reformer 97.

Gaseous fuel produced by the reformer may be injected to intake manifold 44 by way of a gaseous fuel injector 89. In other examples, gaseous fuel may be directly injected into cylinder 30. Gaseous fuel may be supplied to gaseous fuel injector 89 from a reformate storage tank 93. In some examples, the pressure of the gaseous fuel output by the reformer may be sufficient to assist in delivery of gaseous fuel to the reformate storage tank 93, e.g., due to high temperatures in the reformer. However, in some examples a pump may be disposed in a reformate fuel line 69 to assist in pressurizing gaseous fuel output by the reformer. A check valve 82 disposed in reformate fuel line 69 limits flow of gaseous fuel from storage tank 93 to fuel reformer 97 when the gaseous reformate output by the reformer is at a lower pressure than storage tank 93. In some examples, instead of or in addition to the reformate storage tank, gaseous fuel may be supplied to a fuel cell, e.g., in HEV vehicles.

If fuel reformer 97 is supplied with a blend of fuel including alcohol, a portion of the fuel that is not alcohol may not be reformed, thus may condense. Thus, a heat exchanger 83 may be positioned in the reformate fuel line upstream of reformate storage tank 93 to assist in cooling of the gaseous reformate output by the reformer before it reaches the gaseous fuel injection system. In this way, condensate may be captured in the reformate storage tank before reaching the gaseous fuel injection system.

The reformate storage tank 93 may include a drain line 17 coupled to fuel line 90 to direct condensate from the reformate storage tank 93 to the liquid injection line, e.g., fuel supply line 90. As such a check valve 13 may be positioned upstream of the intersection of the drain line 17 and fuel line 90 so as to prevent condensate from flowing back to the fuel tank. In some examples, condensate from the reformate storage tank 93 may be returned to the fuel tank 91. Additionally a condensate metering valve 19 may be disposed in drain line 17 to control an amount of condensate delivered to the liquid injection line or returned to fuel tank 91.

A fuel reformer system may include system components used by fuel reformer 97 for operation. For example, a fuel reformer system may include fuel reformer 97, catalyst 72, fuel line 14, electric heater 98, a reformate fuel lines 69 and 71, reformate pump 96, reformate storage tank 93, drain line 17, and various sensors and other components coupled thereto.

Combustion chamber 30 or one or more other combustion chambers of engine 10 may be operated in a compression ignition mode, with or without an ignition spark. Distributorless ignition system 88 provides an ignition spark to combustion chamber 30 via spark plug 92 in response to controller 12.

An exhaust gas sensor 126 is shown coupled to exhaust passage 48 upstream of reformer 97. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

An exhaust gas recirculation system (EGR) 73 may be coupled to exhaust passage 48 downstream of reformer 97. The EGR system may include an EGR valve 74 and an EGR cooler 75 disposed along the EGR conduit 76. Fuel reformer 97 may assist in cooling exhaust gas recirculated to the engine via EGR system 73.

An emission control device 70 is coupled to the exhaust passage downstream of reformer 97. In some examples, emission control device 70 may be located upstream of reformer 97. Emission control device 70 can include multiple catalyst bricks, in one example. In another example, multiple emission control devices, each with multiple bricks, can be used. In some examples, emission control device 70 may be a three-way type catalyst. In other examples, example emission control device 70 may include one or a plurality of a diesel oxidation catalyst (DOC), selective catalytic reduction catalyst (SCR), and a diesel particulate filter (DPF). After passing through emission control device 70, exhaust gas is directed to a tailpipe 77.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of fuel reformer tank pressure from pressure sensor 85; a measurement of fuel reformer tank temperature from temperature sensor 87; a measurement of air mass entering the engine from sensor 120; and a measurement of throttle position from sensor 58. Barometric pressure may also be sensed (sensor not shown) for processing by controller 12. In some examples, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof.

Though FIG. 1 shows only one cylinder of a multi-cylinder engine, each cylinder may similarly include its own set of intake/exhaust valves, fuel injector, spark plug, etc. Additionally, though FIG. 1 shows a normally aspirated engine, engine 10 may be turbocharged in some examples.

FIG. 2 shows an example method 200 for monitoring a fuel reformer based on entry conditions. At 202, method 200 includes determining whether entry conditions are met to initiate monitoring of a fuel reformer operation.

In some examples, monitoring reformer operation may occur during select engine operating conditions. For example, a fuel reformer may be monitored when a temperature of the reformer is above a threshold temperature. The threshold temperature may be a temperature at which the fuel reformer becomes sufficiently catalytically active. For example, methanol may be reformed to $H_2$, CO, $CO_2$ with high conversion at approximately 300° C. Ethanol may be reformed to $H_2$, CO, $CH_4$ with high conversion at approximately 270° C. Since heat used to catalyze the reformer reaction may come from a thermal coupling of the reformer with the engine exhaust, in some examples the reformer may not be monitored immediately following engine cold starts.

In other examples, various sensor measurements and/or model calculations used in monitoring the reformer may be based on various operating conditions of the engine and/or reformer system. For example, monitoring of a reformer may be based on an amount of reformate delivered to the engine. Thus, in some examples, reformer operation may not be monitored when reformate is not being delivered to the engine.

In other examples, monitoring reformer operation may include interrupting a flow of reformate to the engine. Thus, in some examples, reformer operation may not be monitored during engine operating conditions in which an uninterrupted supply of reformate is provided to the engine. For example, reformer operation may not be monitored during engine cold starts, and/or high load conditions, where reformate may be used to suppress engine knock or assist in engine cold starts.

In other examples, reformer operation may be continuously monitored whenever the reformer is in operation. In still other examples, the reformer system may be continuously monitored whenever the engine is in operation.

If the entry conditions are met at 202, method 200 proceeds to step 204. At 204, method 200 includes monitoring fuel reformer operation. Various operating conditions and/or components of the reformer system and/or engine may be monitored in order to identify, indicate, diagnose, and/or mitigate problems with the reformer system. For example, if reformate is delivered to the engine to reduce knock, e.g., during high load engine operating conditions, but engine knock still occurs, then the reformer may be outputting a significant amount of non-reformed fuel. Thus, in some examples, a degradation of the reformer may be indicated when engine knock occurs while injecting reformate to the engine.

By monitoring a fuel reformer following entry conditions which depend on a plurality of engine and/or reformer operating conditions as described above, errors in metering of reformate delivery may be reduced and degradation of various reformer system components may be diagnosed and mitigated. Additionally, engine knock may be reduced. Another example method for monitoring a reformer based on an amount of fuel injected to the reformer and an amount of reformate output by the reformer is described below with reference to FIG. 3.

Turning now to FIG. 3, an example method 300 for monitoring a fuel reformer is shown. In some examples, a reformer input may be compared with a reformer output to monitor reformer operation. For example, a reformer input may be an amount, e.g. a molar flow rate, of alcohol injected into the reformer and a reformer output may be an amount, e.g., a molar flow rate, of reformed alcohol output by the reformer. By comparing reformer input and output, operating efficiency of the reformer system may be assessed and a degradation in the reformer system may be identified. For example, one mole of ethanol input into an ethanol reformer produces three moles of reformate output by the reformer when the reformer is operating at 100% efficiency.

At 302, method 300 includes injecting an amount of fuel including an amount of alcohol, e.g., ethanol, to be reformed in the fuel reformer. In some examples, fuel injected to the fuel reformer may include a blend of alcohol with one or more other fuels, e.g., ethanol/gasoline blends such as E85, E50, etc. In other examples, fuel injected to the fuel reformer may substantially comprise alcohol, e.g., ethanol. An amount of fuel injected in the reformer may be a volumetric quantity of fuel, e.g. liters. In other examples, an amount of fuel injected in the reformer may be a flow rate, e.g., a molar flow rate of fuel injected in the reformer.

In some examples, high pressures may be generated in the gases passing through the reformer. Thus in some examples, fuel may be injected into the reformer during low pressure conditions. For example, fuel may be injected into the reformer when the amount of gaseous fuel output by the reformer is below a threshold value.

At 304, method 300 includes determining an amount of alcohol, e.g., ethanol, injected in the reformer. In some examples, the amount of fuel injected into the reformer may be metered so that the amount is known e.g., as a molar flow rate of fuel provided to the reformer.

If the alcohol content of the fuel supplied to the reformer is known, then the amount of alcohol injected to the reformer may be determined based on the amount of fuel supplied to the reformer. However, in some examples, the alcohol content of the fuel may be unknown. Thus, in some examples, the amount of alcohol injected to the reformer may be based on various fuel sensors disposed in the fuel lines or fuel tank to determine the amount of alcohol injected in the reformer. In some examples, the metering of alcohol may be performed when alcohol is in liquid form in order to increase accuracy in sensor measurements. For example, a volumetric flow or flow rate sensor may be disposed in fuel line 14 in order to determine the amount of alcohol injected in the reformer.

Additionally, various model calculations may be applied to one or more sensor measurements in order to determine an amount of alcohol injected in the reformer. For example, a liquid volume delivered to the reformer may be converted to an integrated molar flow rate. In some examples, a plurality of estimates may used in determining an amount of alcohol injected in the reformer. For example, a plurality of estimates may be averaged. In some examples, the amount of alcohol delivered to the reformer may be stored in a memory component of an engine controller for further processing.

At 306, method 300 includes determining an amount of reformate produced by the reformer. For example, the amount of reformate produced by an ethanol reformer may be an amount of at least one of $H_2$, CO, and $CH_4$ produced by the reformer. In some examples, the amount of reformate produced by the reformer may be a molar flow rate of reformate produced by the reformer based on a pressure of the reformate gas.

Determination of an amount of reformate produced by the reformer may be based on one or more measurements by a variety of sensors. For example, a sonic metering valve 89 may be disposed in a fuel line between the fuel reformer and the engine, e.g., in fuel line 69 or fuel line 71, to determine a flow rate of reformate produced by the reformer. In some examples, gaseous fuel injectors, e.g., gaseous fuel injector 89, may operate at or near sonic pressure ratios and thus constitute the sonic metering valve. In such a case, the amount of reformate produced by the reformer may be based on pressure and/or temperature measurements upstream of the gaseous fuel injectors. In some examples, the amount of reformate produced by the reformer may be further based on the composition of the gas, e.g., as measured by a sensor upstream of the gaseous fuel injectors. As another example, the amount of reformate produced by the reformer may be based on a pressure of the reformate gas, e.g. as measured by a pressure sensor in the reformate fuel line or reformate storage tank.

Various model calculations may be applied to one or more sensor measurements in order to determine an amount of reformate produced by the reformer. For example, a pressure change in the reformate storage tank may be converted to a molar flow rate using the ideal gas law ($pV=nRT$). In some examples, a plurality of estimates may used in determining an amount of reformate produced by the reformer. For example, a plurality of estimates may be averaged. In some examples, an amount of reformate produced by the reformer may be stored in a memory component of an engine controller for further processing.

An example method for determining an amount of reformate produced by the reformer is described in more detail below with reference to FIG. 4. FIG. 4 shows an example method of determining an amount of reformate produced by the reformer based on changes in operating parameters of various reformer system components.

Turning to FIG. 4, an example method 400 for determining an amount of reformate produced by the reformer is shown. In some examples, an amount of reformate produced by the reformer may be determined based on a pressure and/or temperature change of the reformate gas.

At 402, method 400 includes determining if entry conditions are met for determining an amount of reformate produced by the reformer based on a pressure change of the reformate gas. In some examples, determining an amount of reformate produced by the reformer may be based on a pressure change in the reformate line or storage tank due to an interruption of reformate gas flow to the engine. Thus, the entry conditions may include engine operating conditions which increase pressure sensor and/or temperature sensor accuracy.

For example, entry conditions may include humidity less than a threshold value, engine load less than a threshold value, amount of stored reformate greater than a threshold value, and temperature of the catalyst greater than a threshold value.

Entry conditions may additionally include engine operating conditions such that reformate is being delivered to the engine.

If the entry conditions are met at 402, method 400 proceeds to 404. At 404, method 400 includes determining if delivery of reformate to the engine can be temporarily stopped. For example, delivery of reformate may be temporarily stopped when the engine is operating under low load and/or lean conditions. If delivery of reformate can be temporarily stopped at 404, then method 400 proceeds to 406.

At 406, method 400 includes stopping reformate flow to the engine for a duration. The duration may depend on how long it takes various sensors to detect a pressure change in a reformate fuel line, e.g., in fuel line 69 or fuel line 71, or in the storage tank. Thus in some examples, the duration may depend on the amount of reformate being injected in into the engine (e.g., a flow rate). For example, shorter durations may be employed with higher flow rates.

At 408, method 400 includes determining an amount of reformate output by the reformer based on a pressure change of the reformate gas. For example, a pressure sensor in the reformate fuel line or reformate storage tank, e.g. sensor 85, may be used to monitor a pressure change following an interruption of reformate delivery to the engine. In addition to a pressure change, one or more other reformer system parameters may be used in determining an amount of reformate output by the reformer. For example, temperature may be monitored during the pressure change, e.g., via temperature sensor 87, and the ideal gas law ($pV=nRT$) used to determine a molar flow rate of the reformate output by the reformer.

Once the amount of reformate output by the reformer is determined at 408, e.g. after the duration of the interruption of reformate delivery to the engine has passed, method 400 proceeds to 410. At 410, method 400 includes resuming reformate flow to the engine if the engine is fueled at least partially with reformate.

In some examples, steps 406 and 408 of method 400 may be performed immediately prior to a transition from the engine operating with reformate delivery to the engine operating without reformate delivery. For example, if an engine is fueled with reformate gas during high load conditions to suppress knock, steps 406 and 408 of method 400 may be performed when engine operating conditions transition to low load conditions where the engine is operated without reformate. In this way the amount of reformate output by the reformer may be determined without interrupting reformate delivery to the engine.

At 404, if delivery of reformate to the engine may not be temporarily stopped, e.g. during high load operation and/or when reformate is assisting in knock reduction, then method 400 proceeds to 412.

At 412, method 400 includes determining an amount of reformate delivered from the storage tank to the engine. In some examples, reformate delivery to the engine may be metered so that a quantity or delivery rate is known. For example, the amount of reformate delivery may be a flow rate, or a volume of reformate integrated over a time duration to obtain a flow rate. In some examples, one or more sensors may be used to determine an amount of reformate delivered to the engine. For example, a sonic metering valve may be disposed in the fuel line between the reformate storage tank and the engine, e.g., in fuel line 71, to determine a flow rate of reformate delivered to the engine.

At 414, method 400 includes determining an amount of reformate stored in the storage tank. Determining an amount of reformate stored in the storage tank may be based on one or more sensors coupled to the storage tank, e.g., a pressure sensor and/or a temperature sensor. In some examples, the amount of reformate stored in the storage tank may be a reformate storage rate. For example, a pressure sensor in the reformate storage tank, e.g. sensor 85, may be used to monitor a pressure change in the reformate storage tank while reformate is delivered to the engine. In addition to a pressure change, temperature of the gas in the reformate storage tank may be monitored during the pressure change, e.g., via temperature sensor 87, and the ideal gas law ($pV=nRT$) used to determine a molar rate of storage of reformate in the reformate storage tank.

At 416, method 400 includes determining an amount of reformate output by the reformer based on the amount of reformate delivered to the engine from the storage tank and the amount of reformate stored in the storage tank. For example, reformate production rate (rate of reformate entering the reformate storage tank) may be determined based on the change in the amount of reformate stored in the storage tank and the rate of reformate delivery to the engine. By accounting for reformate out flow from the storage tank to the engine and the amount of stored reformate gas, reformate production may be determined.

It should be understood that one or more of the steps in method 400 described above may be used in determining an amount of reformate produced by the reformer in step 306 of method 300. Also, multiple estimates may be employed in determining an amount of reformate produced by the reformer. Multiple estimates may be used to increase accuracy and identify a degradation in various system components. For example, if one estimate (an outlier) gives an amount of reformate significantly different than amounts determined with other approaches, then the system components used in determining the outlier may be degraded.

Thus at step 306 in method 300, an amount of reformate produced by the reformer may be determined based on engine and/or reformer operating conditions, e.g., as described above with reference to FIG. 4. By determining the amount of reformate output by the reformer, reformer operation may be monitored and degradation of reformer system components may be identified, e.g., by comparing an amount of ethanol delivered to the reformer to the amount of reformate output by the reformer as described below.

Continuing with method 300 in FIG. 3, following the determination of the amount of reformate produced by the reformer in step 306, method 300 proceeds to 308. At 308, method 300 includes determining a ratio of the amount of reformate produced by the reformer, e.g. as determined in step 306, to the amount of alcohol injected in the reformer, e.g., as determined in step 304.

As described above, the amount of reformate produced by the reformer may be an amount, e.g., a molar flow rate, of reformate output by the reformer. Likewise, the amount of alcohol injected to the reformer may be a molar flow rate of alcohol injected into the reformer. Based on the stoichiometry of the reformer reaction, the ratio of the amount of reformate produced by the reformer (reformer reaction products) to the amount of alcohol injected in the reformer (reformer reaction reactants) may be used to determine whether the reformer system is operating efficiently. Thus, at 310, method 300 includes determining whether the ratio is less than a threshold value.

The threshold value may depend on the stoichiometry of the reformer reaction and the identity of the one or more products from the reformer reaction. For example, reformation of ethanol ($CH_3CH_2OH$) into $H_2$, $CO$, and $CH_4$ may occur via the following net reaction: $CH_3CH_2OH(g) \rightarrow H_2(g)+CO(g)+CH_4(g)$. In this example, 1 mole of ethanol is converted into 3 moles of gaseous products. Thus, if the reformer system is operating without degradation at 100% effectiveness, the molar ratio of products to reactants may be approximately 3. Whereas, if the molar ratio of products to reactant is 1 then the reaction is operating with 0% effectiveness, e.g., no ethanol is reformed. If the molar ratio (e.g., based on pressure) of products to reactants is less than 1, ethanol vapor may be condensing.

If the molar ratio of the reformer reaction is less than a threshold value at 310, then method 300 proceeds to 312. At 312, method 300 includes indicating a degradation in the reformer system based on the molar ratio. A degradation in the reformer system may be due to a variety of factors. For example, a degradation in the reformer system may be due to degradation of the reformer catalyst, e.g., due to the age of the catalyst. In other examples, a degradation in the reformer system may be due to degradation of one or more components of the reformer system.

A degradation in the reformer system may result in a significant amount of non-reformed fuel being output by the reformer. As described above, non-reformed fuel in the reformer output may lead to metering errors in the amount of fuel injected into the engine. Metering errors in the amount of fuel injected in the engine may result in a decrease in engine operating efficiency, e.g., due to engine knock, engine misfire, etc. Additionally, a degradation in the reformer system may result in a significant amount condensate output by the reformer. Condensate in reformer output may lead to problems with reformate storage and delivery. In some examples, a drain system may be coupled to the storage tank to return condensate to the fuel tank or the fuel lines.

Further, in some examples, a degradation of the reformer system may be indicated based on an engine operating condition. For example, if reformate is delivered to the engine to suppress engine knock, e.g., during high load engine operating conditions, and engine knock occurs, then a degradation in the reformer system may be indicated.

In some examples, a degradation indicated in the reformer system may be sent to an onboard diagnostic system. The onboard diagnostic system may alert a vehicle operator of the indicated a degradation and/or initiate mitigating actions in response to the indicated a degradation.

The molar ratio of products to reactants in the reformer reaction may be used to assist in identification of sources of the indicated degradation. For example, if ethanol is reformed to $H_2$, $CO$, and $CH_4$ and the molar ratio is less than 1, then ethanol condensate may be forming in the reformer or reformer output. Condensation formation may be due to insufficient temperatures and/or pressures in the reformer or reformer fuel lines. However, if the molar ratio is less than 3 but greater than 1, then the indicated degradation may be due to a degraded catalyst in the reformer, for example.

At 314, method 300 includes performing mitigating actions if a degradation in the reformer system is indicated. In some examples, mitigating actions may be based on the molar ratio of products to reactants in the reformer reaction. As described above the ratio may be used to assist in identifying components of the reformer system which may be at degradation. Thus, in some examples, mitigating actions may be tailored specifically to suspect components of the reformer system. Mitigating actions may further include adjusting one or more engine operating parameters in response to an indicated reformer degradation. For example, if reformate is delivered to the engine to suppress engine knock but engine knock still occurs, then one or more engine operating parameters may be adjusted to reduce engine knock. For example, air charge and/or spark timing may be adjusted to assist in knock reduction when unexpected engine knock occurs while delivering reformate to the engine.

In this way, operation of the fuel reformer may be monitored based on an amount of fuel delivered to the fuel reformer and an amount of reformate output by the reformer, e.g., based on the reformer reaction stoichiometry. Monitoring a fuel reformer in this way may assist in identification of degraded reformer system components. Mitigating actions may be implemented based on an indication of degraded system components. Mitigation actions may include adjusting one or more engine and/or reformer operating conditions based on an indication of degraded system components.

FIG. 5 shows an example method 500 for performing mitigating actions in response to an indication of a degradation in the reformer system.

At 502, method 500 includes determining if there is non-reformed alcohol in the reformer output. Determining if there is non-reformed alcohol in the reformer output may based on an amount reformate output by the reformer as described above with regard to FIG. 3. For example, if the molar ratio of the products to reactants of the reformer reaction is less than 3 then non-reformed ethanol may in the reformer output.

If non-reformed alcohol is in the output at 502, then method 500 proceeds to 504. At 504, method 500 includes determining if condensate is in the reformer output. Determining if condensate is in the reformer output may be performed by using the mole ratio of the reaction as described above with regard to FIG. 4. For example, if the molar ratio of the products to the reactants of the reformer reaction is less than 1 then condensate may be in the reformer output.

At 504, method 500 includes determining if condensate is in the reformer output. As described above, condensate may be in the reformer output if the molar ratio of the products to reactants of the reformer reaction is less than a threshold value, e.g., less than 1. If condensate is not in the reformer output at 504, then non-reformed alcohol is in the reformer output but is not forming condensate and method 500 proceeds to 506.

At 506, method 500 includes injecting fuel in the reformer at a reduced rate. For example, a flow rate of fuel provided to the reformer may be reduced. In some examples, fuel injection to the reformer may be stopped for a duration and then gradually increased until the molar ratio of the reformer reaction approaches a target level, e.g., 3. Method 500 then proceeds to 508 to determine if the molar ratio is approximately equal to the threshold value. If not then, method 500 may return to step 506 to continue injecting fuel into the reformer at a reduced rate until the molar ratio of the reformer reaction approaches the threshold value at 508.

Once the molar ratio of the reformer reaction reaches the threshold value at 508, method 500 proceeds to 510. At 510, method 500 includes increasing the amount of fuel injected to the reformer, e.g. the amount of fuel injected to the reformer may be increased to an amount or level used before the mitigating routine 500 is implemented.

However, if condensate forms in the reformer output at 504, e.g., based on the molar ratio of the reformer reaction less than a threshold, then the temperature of the reformer may not be sufficient to keep alcohol in vapor form as it traverses the reformer system. For example, condensate may form in the reformer unit, or in the reformate fuel line. Method 500 then proceeds to step 512.

At 512, method 500 includes stopping injection of fuel to the reformer. However, in some examples, the amount of fuel injected to the reformer may be decreased so that reformate may continue to be produced albeit inefficiently. The method then proceeds to 514.

At 514, method 500 includes determining if the temperature of one or more components of the reformer system is larger than a threshold temperature. The threshold temperature may be a temperature at which alcohol will remain in vapor form as it traverses the reformer catalyst and/or the fuel lines in the reformer system, e.g., fuel line 69. For example, the threshold temperature may be 78° C. for ethanol. In some examples a pressure and/or temperature of one or more components of the reformer system may be compared to threshold values to ensure that alcohol remains a vapor.

If the temperature is less than the threshold temperature at 514, then method 500 proceeds to 516. At 516, method 500 includes adjusting temperature of the reformer system, if possible, e.g. via bypass valve 22, electric heater 98, or by adjusting one or more engine operating parameters. For example, the engine may be run rich for a duration in order to increase exhaust temperature thereby increasing reformer temperature. Once the temperature is larger than the threshold temperature at 514, method 500 proceeds to step 506.

At 506, method 500 includes injecting fuel in the reformer at a reduced rate. In some examples, fuel injection to the reformer may be stopped for a duration and then gradually increased until the molar ratio of the reformer reaction approaches a threshold value, e.g., 3. Method 500 then proceeds to 508 to determine if the molar ratio is approximately equal to the threshold value. If not then, method 500 may return to step 506 to continue injecting fuel into the reformer at a reduced rate until the molar ratio or the reformer reaction approaches the threshold value at 508.

Once the molar ratio of the reformer reaction reaches the threshold value at 508, method 500 proceeds to 510. At 510, method 500 includes increasing the amount of fuel injected to the reformer, e.g. the amount of fuel injected to the reformer may be increases to an amount used before the mitigating routine 500 is implemented.

Mitigating actions performed in response to an indication of a degradation in the reformer system may further include adjusting engine operating conditions based on a molar ratio of the products to reactants of the reformer reaction. For example, if ethanol is reformed to $H_2$, CO, $CH_4$ and if the molar ratio of the products to reactants is less than 3, then at least a portion of the ethanol is not being reformed by the reformer. Thus, the amount of reformate fuel delivered to the engine may be increased to compensate for the decrease in reformer output.

In this way, mitigating actions may be performed in response to an indication of degradation of one or more reformer system components. For example, one or more engine and/or reformer operating conditions may be adjusted based on identified degradations in the fuel reformer system. Additionally, mitigation actions may be tailored to specific components which have been identified as degraded by the monitoring routines described above. Thus errors in metering of reformate delivery may be reduced and degradation of various reformer system components may be diagnosed and mitigated. Additionally, engine knock may be reduced during high load conditions, for example.

In one embodiment, a method is provided for monitoring a fuel reformer which reforms ethanol into a reformate gas comprising H2, CO, and CH4 for fueling an engine. The method may comprise indicating degradation of the fuel reformer based on an amount of engine knock which occurs while reformate gas is delivered to the engine. As an example, the reformate gas is cooled before being delivered to the engine.

Note that the example systems and methods included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for monitoring a fuel reformer which reforms ethanol into a reformate gas comprising $H_2$, CO, and $CH_4$ for fueling an engine, comprising:
   measuring a flow rate of the reformate gas; and
   indicating degradation of the fuel reformer based on a ratio of an amount of the flow rate of the reformate gas to an amount of alcohol injected into the fuel reformer being less than a threshold.

2. The method of claim 1 wherein the flow rate of the reformate gas is determined in response to temporarily stopping reformate gas flow into the engine.

3. The method of claim 1 wherein the flow rate of the reformate gas is measured based on a flow rate sensor in a fuel line between the fuel reformer and the engine.

4. The method of claim 1 wherein the flow rate of the reformate gas is measured based on an amount of stored reformate gas and a sonic metering valve in a fuel line between the fuel reformer and the engine.

5. The method of claim 1 further comprising performing mitigation actions if degradation of the fuel reformer is indicated.

6. The method of claim 5 wherein the mitigation actions include adjusting a temperature of the fuel reformer.

7. The method of claim 5 wherein the mitigation actions include stopping ethanol injection into the fuel reformer.

8. The method of claim 5 wherein the mitigation actions include injecting ethanol into the fuel reformer only when a temperature of the fuel reformer is such that injected ethanol would remain in vapor form.

9. The method of claim 5 wherein the mitigation actions include reducing an ethanol injection rate into the fuel reformer until the ratio returns to a target level.

10. A method for monitoring a fuel reformer which reforms ethanol into a reformate gas comprising $H_2$, CO, and $CH_4$, comprising:
   injecting an amount of fuel including an amount of alcohol to be reformed into the fuel reformer; and
   indicating degradation of the fuel reformer based on the amount of alcohol injected into the fuel reformer and an amount of $H_2$, CO, and $CH_4$ produced by the fuel reformer.

11. The method of claim 10 wherein indicating degradation of the fuel reformer is further based on a ratio of the amount of at least one of $H_2$, CO, and $CH_4$ produced by the fuel reformer to the amount of alcohol injected into the fuel reformer being less than a threshold value.

12. The method of claim 11 wherein the amount of alcohol injected into the fuel reformer is a molar flow rate of alcohol injected into the fuel reformer and the amount of at least one of $H_2$, CO, and $CH_4$ produced by the fuel reformer is a molar flow rate of at least one of $H_2$, CO, and $CH_4$ produced by the fuel reformer.

13. The method of claim 11 wherein the amount of at least one of $H_2$, CO, and $CH_4$ produced by the fuel reformer is determined by temporarily stopping reformate gas flow into the engine and determining the amount of at least one of $H_2$, CO, and $CH_4$ produced by the fuel reformer via a pressure rise.

14. The method of claim 11 wherein the amount of at least one of $H_2$, CO, and $CH_4$ produced by the fuel reformer is based on a flow rate sensor in a fuel line between the fuel reformer and the engine.

15. The method of claim 11 wherein the amount of at least one of $H_2$, CO, and $CH_4$ produced by the fuel reformer is based on an amount of stored reformate gas and a sonic metering valve in a fuel line between the fuel reformer and the engine.

16. The method of claim 10 wherein the amount of alcohol injected into the fuel reformer is determined when the alcohol is in a liquid state.

17. The method of claim 10 further comprising performing mitigation actions if degradation of the fuel reformer is indicated, the method further comprising delivering alcohol and the reformate gas to an internal combustion engine.

18. A system comprising:
   a fuel reformer which reforms alcohol into $H_2$, CO, and $CH_4$;
   an engine receiving the reformed alcohol;
   a computer readable storage medium having instructions encoded thereon, including:
   instructions to indicate degradation of the fuel reformer based on an amount of alcohol injected into the fuel reformer and an amount of at least one of $H_2$, CO, and $CH_4$ produced by the fuel reformer.

19. The system of claim 18, wherein the computer readable storage medium having instructions encoded thereon further includes instructions to perform mitigation actions if degradation of the fuel reformer is indicated.

20. A method for monitoring a fuel reformer which reforms ethanol into a reformate gas comprising $H_2$, CO, and $CH_4$ for fueling an engine, comprising:
   indicating degradation of the fuel reformer via a controller based on an amount of engine knock which occurs while reformate gas is delivered to the engine.

21. The method of claim 20, wherein the reformate gas is cooled before being delivered to the engine.

* * * * *